United States Patent [19]

Clark et al.

[11] 4,259,931
[45] Apr. 7, 1981

[54] VALVE SELECTOR MODULE ASSEMBLY

[75] Inventors: David P. Clark, Battle Creek; John L. Eustis, Richland, both of Mich.

[73] Assignee: Eaton Corporation, Cleveland, Ohio

[21] Appl. No.: 58,355

[22] Filed: Jul. 17, 1979

[51] Int. Cl.³ .............................................. F02D 13/06
[52] U.S. Cl. .............................. 123/198 F; 123/90.43; 123/90.16; 123/198 R
[58] Field of Search ............ 123/198 F, 198 R, 90.43, 123/90.16

[56] References Cited

U.S. PATENT DOCUMENTS

| | | | |
|---|---|---|---|
| 4,050,435 | 9/1977 | Fuller, Jr. et al. | 123/198 F |
| 4,114,588 | 9/1978 | Jordan | 123/90.43 |
| 4,141,333 | 2/1979 | Gilbert | 123/198 F |
| 4,173,209 | 11/1979 | Jordan | 123/198 F |
| 4,200,081 | 4/1980 | Meyer et al. | 123/198 F |
| 4,213,442 | 7/1980 | Mihalic | 123/90.43 |

*Primary Examiner*—P. S. Lall
*Attorney, Agent, or Firm*—R. J. McCloskey; E. C. Crist

[57] ABSTRACT

A valve selector rotary latch mechanism is provided having an improved locating clip (46, 47) for aligning a telescoping spring capsule subassembly (38, 40) relative to the position of a rotary acting blocker plate (41, 42) and a mounting bracket (36) which connects a solenoid actuator (31) through a linkage (43, 44) to the blocker plates. The locater clip is formed of a resilient spring steel and includes a folded-over horizontal portion (77, 78) which is connected by means of a flared eyelet (66) through the mounting bracket and a looped portion (88) which extends beyond the bracket with an end tap (90) thereof being in locking engagement with a notch (74, 76) formed in the side wall of the telescoping spring capsule subassembly. A locking tab (80) is formed on the end of the folded-over portion and extends into an opening in the bracket for preventing rotation of the clip as the valve selector is assembled to the engine cylinder head. A downwardly extending tab (98, 100) formed on the bracket extends into a channel (92) formed adjacent the end of the looped portion and functions to position the locater clip relative to the blocker plate and the mounting bracket.

9 Claims, 9 Drawing Figures

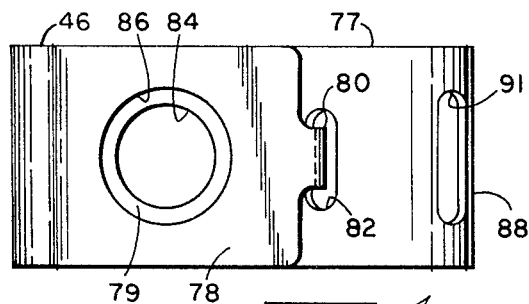
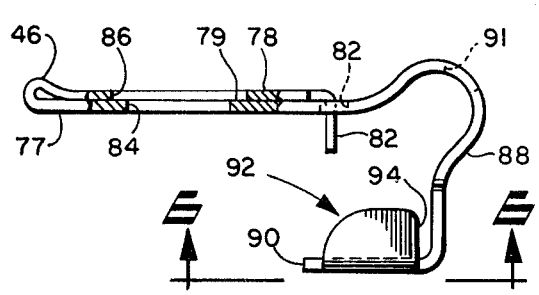 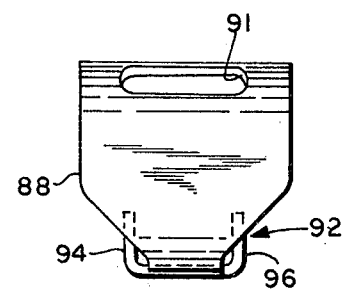
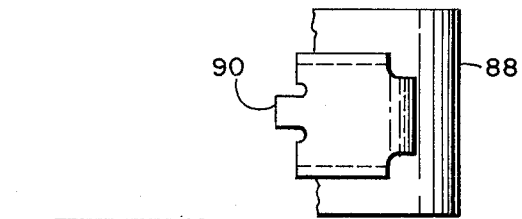
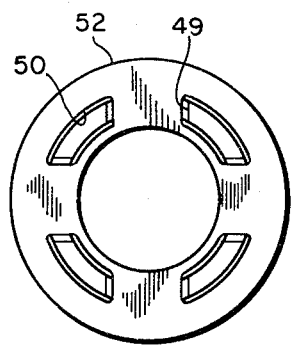 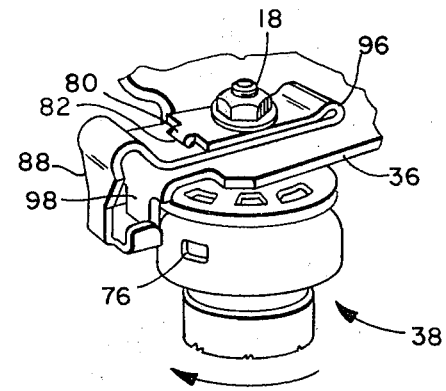

VALVE SELECTOR MODULE ASSEMBLY

BACKGROUND OF THE INVENTION

This invention relates to an improved rotary latch mechanism for a valve selector used in an internal combustion engine.

DESCRIPTION OF THE PRIOR ART

Valve selector latching mechanisms of the type shown and described in copending application Ser. No. 897,833 assigned to the assignee of the present application incorporate telescoping spring capsule subassemblies and rotary acting blocker plates actuated through a connecting linkage by an electrical coil. The blocker plate has a plurality of circumferentially spaced openings therein which alternately align and misalign with finger extensions in the spring capsule subassembly. In the aligned position the finger extensions pass through the blocker plate openings, permitting the lower surface of the spring capsule subassembly to float. The floating action results in rocker arm pivoting about the valve stem, thereby disabling the valve. With the blocker plate in the misaligned position, the spring capsule subassembly presents a rigid reaction surface for normal rocker arm pivotal motion. It is therefore necessary to align the spring capsule subassembly relative to blocker plate rotation and the openings therein. Alignment has heretofore been accomplished by the use of a downwardly extending tab which is formed integrally with a mounting bracket. A locating notch or window in an upper cup shaped member is then aligned with the mounting bracket tab by moving the spring capsule subassembly horizontally relative to the mounting bracket. Since the spring capsule must first be aligned relative to the tab on the mounting bracket, complicated and costly automated assembly equipment is then required to produce such valve selectors in production quantities.

SUMMARY OF THE INVENTION

In the present invention an improved valve selector module assembly is provided which incorporates a spring steel locater clip for aligning a valve selector spring capsule subassembly relative to a valve selector mounting bracket.

The locater clip comprises a folded over horizontal portion and a U-shaped portion which terminates in an upwardly opening channel and an end tab. The folded over portion defines a counterbore which provides a seat for the end of a tubular member which retains the valve selector mechanism in assembly prior to assembly on the engine cylinder head. An end tab formed at the end of the folded-over section extends through an opening in the adjacent horizontal section. The end tab extends into a corresponding opening in the valve selector mounting bracket to prevent the clip from rotating with respect to the cylinder head. It has been found that frictional forces exerted by an engine cylinder head mounting nut which abuts against the clip in final assembly to the engine would, absent the tab, tend to rotate the clip.

The upwardly extending channel formed adjacent one end of the clip registers with a downwardly extending tab formed in the valve selector mounting bracket or bridge plate and functions together with the locking tab to register the locating clip relative to the bridge plate.

A locating notch or window is formed through the side wall of the spring capsule and registers with the tab at the end of the U-shaped section for establishing the angular position of the spring capsule.

During automated assembly procedures the telescoping spring capsule subassembly is assembled to a rotary acting blocker plate, a blocker spacer which functions as a bushing for the blocker plate and also for providing axial clearance for the blocker plate, a stop plate, a bridge plate or mounting bracket, and the locating clip by a tubular retainer which extends through aligned openings in the aforementioned parts. The lower end of the tubular retainer is crimped against the inside top surface of the spring capsule spring retainer and its upper end is crimped over the counterbore defined by the locating clip. After this assembly operation has been completed, the spring capsule subassembly can be freely rotated by hand until the tab at the U-shaped end snaps into the spring capsule notch thereby establishing the angular position of the capsule relative to blocker plate rotation.

It is therefore the object of the invention to provide a valve selector which is adaptable to semi-automatic procedures for assembly prior to installation on an engine.

BRIEF DESCRIPTION OF THE DRAWINGS

FIG. 4 is a top plan view in elevation of the locater clip of the embodiment of FIG. 1;

FIG. 5 is a side view in partial cross section of the locater clip of FIG. 4;

FIG. 6 is a partial bottom view taken along lines 6—6 of FIG. 5 of the locater clip and rotated 90 degrees clockwise;

FIG. 7 is a right side view in elevation of the locater clip of FIG. 5;

FIG. 8 is a top plan view of the spring capsule subassembly of FIG. 1 with the mounting bracket and locater clip omitted for clarity of illustration; and FIG. 9 is a perspective view showing a portion of the valve selector of FIG. 1 with the spring capsule subassembly in misalignment with respect to the locater clip.

DETAILED DESCRIPTION

Figure 1:
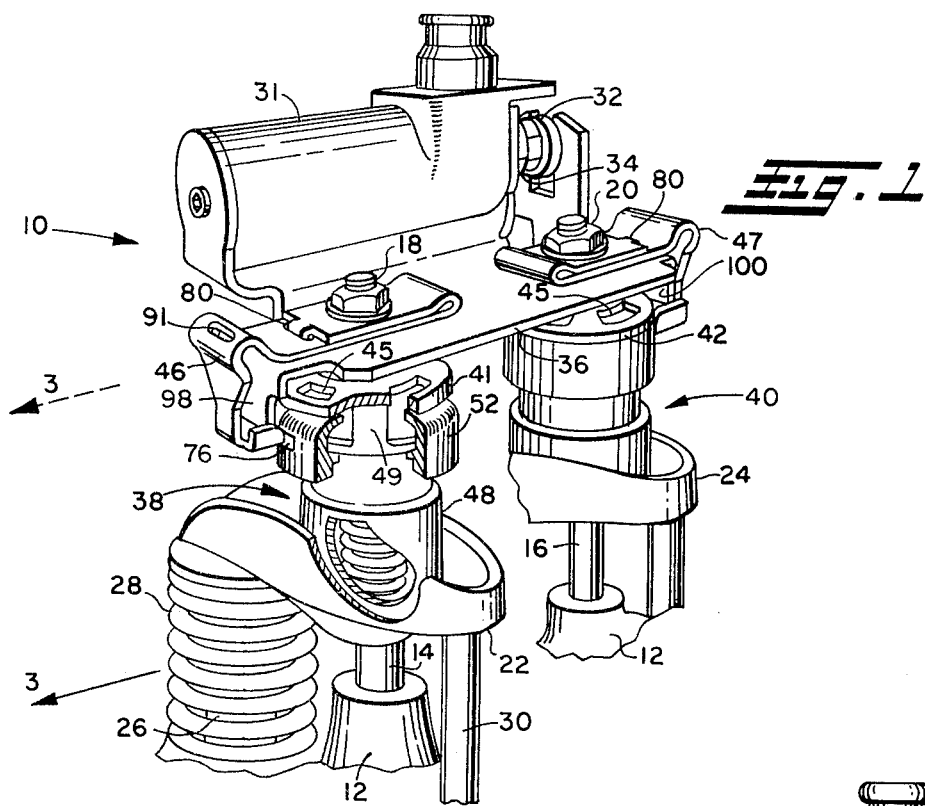
FIG. 1 is a perspective view of the valve selector embodying the principles of the invention and shown in association with portions of an engine valve gear.

Referring now to FIG. 1 a valve selector, indicated generally at 10, incorporating the principles of invention is mounted on an engine cylinder head 12 by means of studs or rocker posts 14 and 16 and retaining nuts 18 and 20. Valve selector 10 is shown in association with portions of a pushrod type internal combustion engine valve train which includes rocker arms 22 and 24, a poppet valve stem 26 in contact with rocker arm 22, a valve spring 28 biasing the poppet valve to a closed position, and a pushrod 30 which actuates the poppet valve to an open position by a camshaft lobe (not shown) acting usually through a hydraulic tappet (not shown).

Valve selector 10 includes an actuating solenoid 31 having an output plunger 32 and a solenoid return spring 34. A mounting bracket 36, also known as a bridge plate, supports solenoid 31. A pair of telescoping spring capsule subassemblies indicated generally at 38 and 40 and also designated as collapsible means are mounted on studs 14 and 16, respectively.

Figure 2:
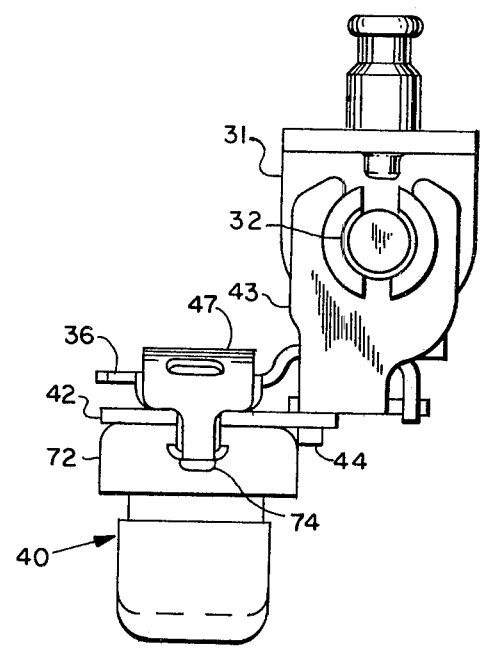
FIG. 2 is a partial view in elevation taken from the right side of FIG. 1 illustrating a portion of the connecting linkage of the valve selector.

Rotary acting blocker plates 41 and 42, also designated as latch means, are positioned adjacent the top end of each spring capsule subassembly and are connected to solenoid plunger 32 by solenoid link 43 and blocker plate link 44 shown partially by FIG. 2. A plurality of circumferentially spaced openings 45 are formed in each blocker plate (FIG. 1).

Locater clips 46 and 47 are mounted over mounting studs 14 and 16, respectively, and function to establish the angular position of each spring capsule subassembly relative to its corresponding blocker plate and mounting bracket 36, as will be described below in greater detail. In the preferred form of the invention clips 46 and 47 are fabricated from a suitable spring steel. Although the invention is illustrated as employed in a particular style valve gear, it will be understood by those skilled in the art that such devices may also be employed in engines having other valve gear arrangements as, for example, an overhead cam valve gear system: and, the particular valve gear arrangement forms no part of the present invention.

Figure 3:
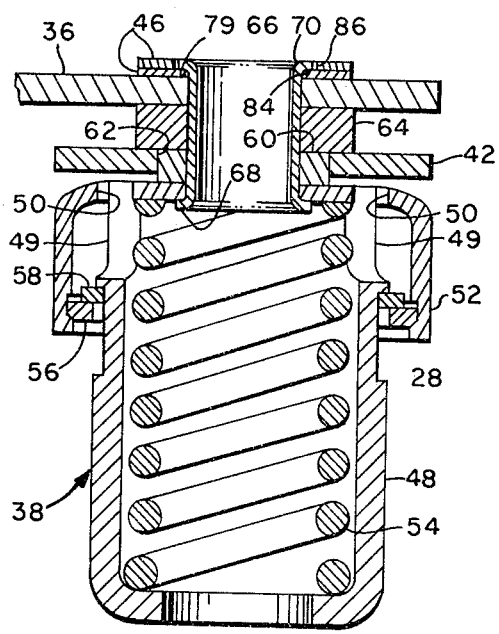
FIG. 3 is a cross-sectional view through section lines 3—3 of FIG. 1 illustrating the mounting arrangement of the spring capsule subassembly and associated components.

Referring now to FIGS. 3 and 8, spring capsule subassembly 38 is shown as including a lower cup shaped spring receiving member 48 which terminates at its upper end in a plurality of circumferentially spaced finger extensions 49 (FIG. 8), one of which is shown in FIG. 1. Extensions 49 extend through a plurality of openings 50 (FIGS. 3, 8) which are circumferentially spaced and formed through the base of a cup case structure or shaped spring retainer 52 having the open end thereof received over the open end of cup 48.

A biasing spring 54 is captured between retainer 52 and spring receiving cup member 48. Snap rings 56 and 58 are mounted in grooves formed, respectively, in the inner periphery and adjacent the open end of retainer 52 and the outer periphery below fingers 49 of spring receiving member 48, and function to limit the maximum longitudinal height of spring capsule subassembly 38. The snap ring and groove arrangement is described in greater detail in copending United States patent application Ser. No. 897,833 assigned to the assignee of the present application.

With continued reference to FIGS. 3 and 8, a first annular spacer 60 having a thickness slightly greater than the thickness of blocker plate 42 is received in a bore 62 formed in plate 42 and functions to radially guide and locate plate 42 and also to provide axial clearance for free rotation of plate 42. A second spacer 64 is located intermediate mounting bracket 36 and spacer 60.

Locater clip 46 is positioned against the top surface of bridge plate 36. A tubular retainer 66 also designated a hollow fastening means, extends through aligned openings in members 52, 64, 36 and 46 and has a lower end 68 flared over the inside surface of retainer 52 and an upper end 70 flared over a portion of locater clip 46.

Referring now to FIG. 2, spring capsule subassembly 40 includes an upper spring retainer 72 having a registration surface defined by a notch or window 74 formed through its side wall. As illustrated by FIG. 1, a corresponding notch 77 is shown partially in upper spring retainer 52.

Locater clips 46 and 47 are identical in structure and therefore like reference numerals refer to identical structural features.

Referring now to FIG. 5, locater clip 46 is includes a horizontal portion 77 and a folded over portion 78 which terminates in a downwardly extending tab 80, also designated as a lug structure. As shown by FIG. 4, tab 80 extends through an opening 82 in horizontal portion 77. As shown in FIG. 4, circular holes 84 and 86 are formed in horizontal portion 77 and folded-over portion 78, respectively, and define a shoulder or seating surface 79 for upper flared end 70 of tubular retainer 66 as shown by FIG. 3. The locater clip 46 includes a hook-shaped or looped portion 88 (FIG. 5) which extends rightwardly and downwardly from horizontal portion 77 and terminates in a tab 90.

Referring to FIGS. 6 and 7, a slot 91 is formed in clip portion 88 for increasing bending flexibility. As shown by FIGS. 5 and 7, a channel, indicated generally at 92, is formed by upwardly extending ears 94 and 96 formed on the tab 90.

Referring to FIG. 1, bracket 36 has formed at each end downwardly extending tabs 98 and 100, also designated as guides, which function to orient locater clips 46 and 47 relative thereto. Openings (not shown) are formed in bracket 36 for permitting tabs 80 to extend therethrough.

At assembly, the flexibility of clip 46 enables it to be positioned in place over bracket 36 and spring retainer 52 without the necessity of aligning tab 90 with notch 76 in the capsule subassembly. This feature permits semi-automatic assembly since the components of FIG. 3 can be stacked on a fixture and tubular member 66 flared in place in a substantially continuous operation.

FIG. 9 illustrates the position of tab 90 during assembly prior to alignment with notch 76 and with looped portion 88 deflected outwardly. The openings 50 and fingers 49 of the spring capsule subassembly 38 are aligned to the proper angular position relative to the blocker plate by rotating the capsule subassembly in the direction shown by the arrow of FIG. 9 until tab 90 snaps into notch 76. Alignment of the capsule subassembly is thus readily and conveniently made prior to assembly of valve selector 10 to the engine cylinder head.

The operation of valve selector 10 as it relates to engine operation will now be described. The description applies to the valve gear beneath each spring capsule subassembly (38, 40), but will be directed only to the structure associated with subassembly 38.

To effect valve disabling, blocker plate 41 is rotated by solenoid 31 acting through linkage 43, 44 and is rotated only when the cyclic forces on pushrod 30 are relaxed to a position in which the openings 45 therein are aligned over the openings 50 in spring retainer 52, thus permitting the finger extensions 49 of spring receiving member 48 to move upwardly therein upon upward movement of rocker arm 22 under the urging of pushrod 30.

The lost motion movement or telescoping of spring receiving member 48 toward spring retaining member 52 permits a fulcrum member (not shown) intermediate rocker arm 22 and member 48 to rise a predetermined amount resulting in rocker arm 22 pivoting about a fulcrum center defined by the contact point between valve stem 26 and rocker arm 22 (left side relative to FIG. 1). Pivoting then occurs about this point rather than the fulcrum surface beneath spring capsule subassembly 38. In the presently preferred practice, the spring rate of spring 54 is chosen to permit compression thereof with accompanying deflection of valve spring 28, with the result being disabling of the valve.

Enabling of the valve opening is achieved by de-energizing solenoid 31 while pushrod 30 is at its lowest position with a hydraulic tappet (not shown) riding on the base circle portion of a cam lobe (not shown). While the pushrod is in this lowest position, spring 54 urges the spring receiving member 48 downward with respect to the spring retainer 52. The finger extensions 49 are now withdrawn from the openings 45 in the blocker plate, whereupon solenoid return spring 34 rotates the blocker plate 41 to a position blocking re-entry of the finger extensions 49 therein. Upon subsequent raising of the pushrod 31, the ends of fingers 49 register against the underside of blocker plate 41 preventing collapse of subassembly 38 and a rigid fulcrum point is defined beneath the capsule, as illustrated in FIG. 1.

The embodiment of the invention as shown and described above is representative of the inventive principles stated therein. It is to be understood that variations and departures can be made from the embodiment as shown without departing from the scope of the invention which is limited only by the appended claims.

What is claimed is:

1. A valve selector module assembly for an internal combustion engine of the type having post mounted rockers and operative when installed in an engine for enabling and disabling the combustion chamber valves, said assembly comprising:
   (a) mounting bracket means defining a pair of spaced apertures each adapted to be received, respectively, over one of the engine rocker mounting posts for the valves of an engine combustion chamber;
   (b) latch means disposed adjacent each of said apertures, said latch means including a control member rotatable with respect to said bracket means and adapted for receiving one of said engine rocker posts therethrough;
   (c) collapsible means disposed adjacent each of said latch means, said collapsible means having case structure defining a registration surface thereon said collapsible means having a passage therein adapted to receive one of said engine rocker posts therethrough, said case structure being oriented with respect to said bracket means such that when said control member is in a first position collapse of said collapsible means is prevented and upon rotation of said control member to a second position collapse of said collapsible means is permitted upon cyclic application of valve train forces thereto;
   (d) locator means including a member having an apertured portion disposed adjacent each of said spaced apertures on said bracket means and opposite said latch means, said locater means further including structure operable to engage said registration surface on said collapsible means case structure and operable to orient said collapsible means case structure with respect to said bracket means;
   (e) hollow fastening means received through the apertured portion of said locater means and operable to retain said bracket means, latch means, locater means and collapsible means in stacked assembly said hollow means being adapted for receiving an engine rocker post therethrough;
   (f) said locater means further including structure operable upon receipt of a rocker post through said hollow means and retention thereon by a nut, to prevent rotation of said apertured portion of said locater means by said nut.

2. The module assembly defined in claim 1, wherein said bracket means includes structure defining a guide disposed adjacent said case structure in spaced relationship thereto and wherein said locater means engaging structure is in registration with said guide for preventing rotation of said locater means engaging structure with respect to said bracket means.

3. The module assembly defined in claim 1, wherein said locater means includes structure operable, upon receipt of a rocker post through said hollow fastening means and tightening of a nut threaded thereover, to prevent the frictional forces of the nut from rotating said apertured portion of said locater means.

4. The module assembly defined in claim 1, wherein said locater means includes lug structure operable, upon receipt of a rocker post through said hollow fastening means and tightening of a nut threaded thereover, to prevent the frictional forces of the nut from rotating said apertured portion of said locater means, and wherein said bracket means includes a recess therein receiving said lug structure in registering engagement.

5. In a valve selector for selectively enabling and disabling a combustion chamber poppet valve in an internal combustion engine, said valve selector being of the type having a rotatable blocker plate and a telescoping spring capsule assembly, a mounting bracket, and means for connecting said blocker plate and said spring capsule subassembly to said bracket, wherein the improvement comprises,
   (a) said telescoping spring capsule assembly including
      (i) a lower cup shaped body member having a plurality of fingers extending from the top end thereof,
      (ii) an upper body member having a plurality of openings therethrough, said plurality of fingers extending through said upper body openings, said upper body member having registration surface means thereon and positioned in a predetermined location relative to said openings;
   (b) said blocker plate having a plurality of openings therethrough, said blocker plate rotatable between a first position in which said plate openings are aligned with said plurality of fingers and a second position in which said fingers abut against said blocker plate for preventing lost motion of said capsule assembly; and
   (c) means for positioning said upper body member relative to said bracket and said blocker plate prior to mounting said valve selector on said engine such that said fingers are aligned with said blocker plate openings while said blocker plate is in said first position, said positioning means including,
      (i) a resilient locator member having a first portion connected to said bracket,
      (ii) said locator member having a second looped portion which extends around said bracket and terminates in a first tab, said first tab in locking engagement with said registration surfaces of said upper body member, and in locking engagement with said registration surface means of said upper body member and (iii) means for positioning said locater member relative to said bracket.

6. The improvement as defined in claim 5, wherein,
(a) said bracket has an opening therein; and
(b) said locater member has a second tab portion extending into said bracket opening for preventing said locater member from rotating relative to said bracket.

7. The improvement as defined in claim 5, wherein said means for positioning said locater member relative to said bracket includes,
(a) said locater member having an upwardly opening channel portion; and
(b) said bracket includes a downwardly extending tab portion, said tab portion extending into said channel portion for preventing rotation of said locater member relative to said bracket.

8. In a rotary latching mechanism for an internal combustion engine valve selector of the type having a telescoping spring capsule, a rotary blocking plate, and a mounting bracket, wherein the improvement comprises:

(a) said spring capsule having an upper spring retainer member, said spring retainer member having a notch in the outer surface thereof;
(b) said bracket having a notch therein;
(c) a locating clip connected to said bracket, said clip including,
(i) a first horizontal portion adjacent said bracket,
(ii) a downwardly extending tab, said tab extending into said notch,
(iii) a second looped portion extending beyond said bracket and returning toward said upper spring retainer member, said second portion having an end in locking engagement with said notch such that said spring capsule is positioned in a predetermined angular relationship to said bracket and said rotary blocking plate.

9. The improvement as defined in claim 8, wherein,
(a) said bracket includes a downwardly extending tab, and
(b) said locating clip includes an upwardly opening channel portion, said tab extending into said channel portion.

* * * * *